Aug. 15, 1950     M. DWYER ET AL     2,519,123
HAND OPERATED ROCKET TYPE DEVICE FOR
SIGNALING AND OTHER PURPOSES
Filed July 10, 1947     4 Sheets-Sheet 2
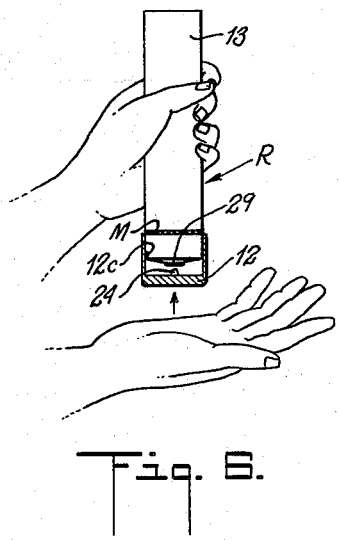
Fig. 6.
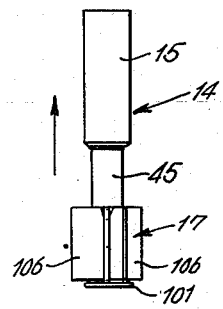
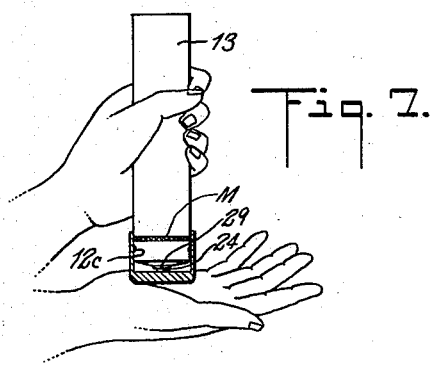
Fig. 7.
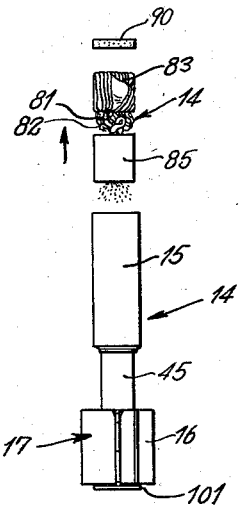
Fig. 8.
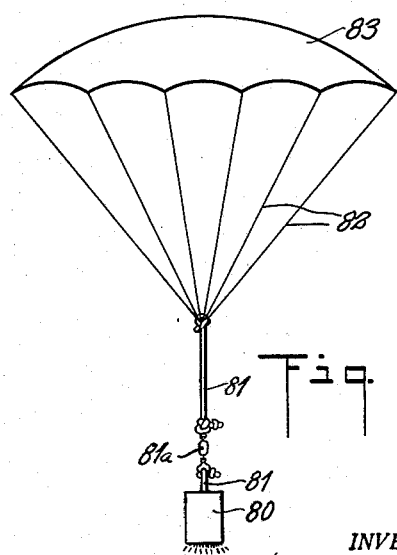
Fig. 9.
INVENTORS.
Martin Dwyer
Ralph Anzalone
BY
Kenyon & Kenyon
ATTORNEYS

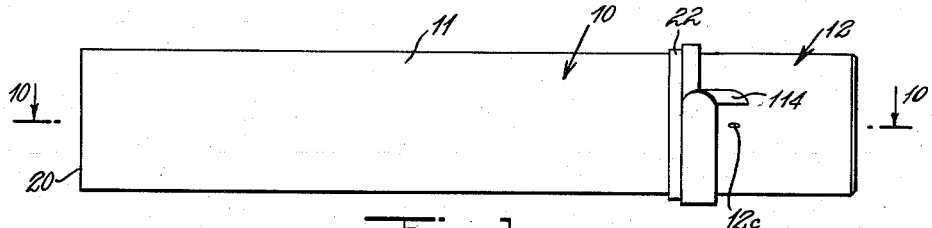
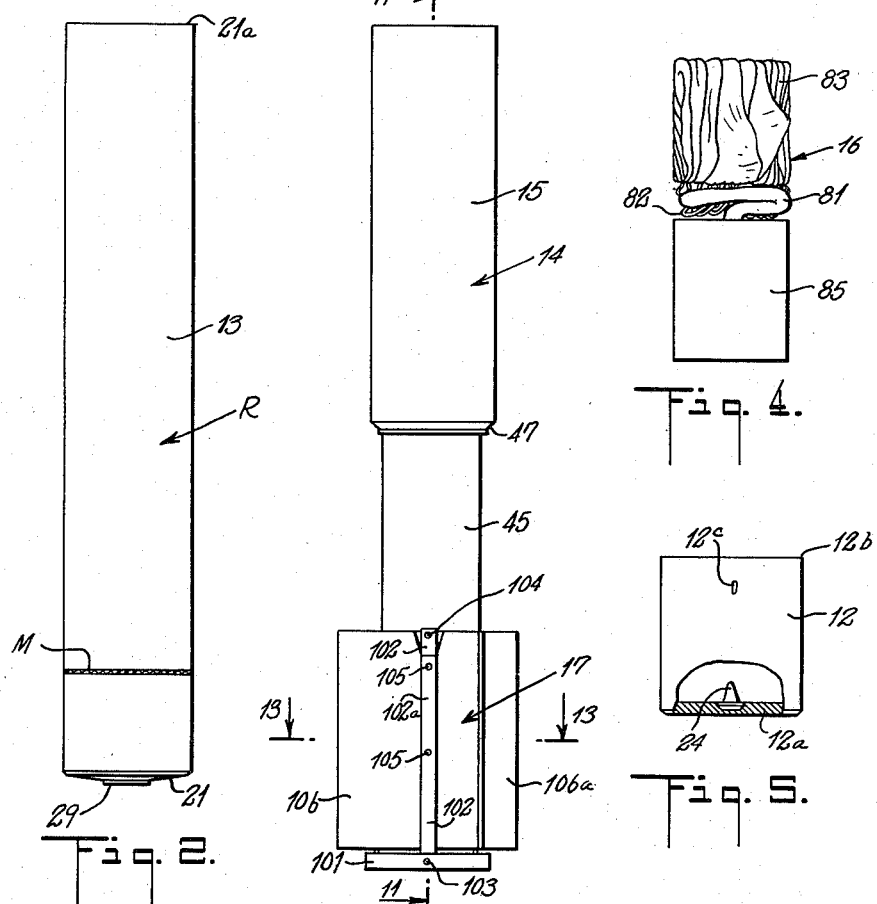

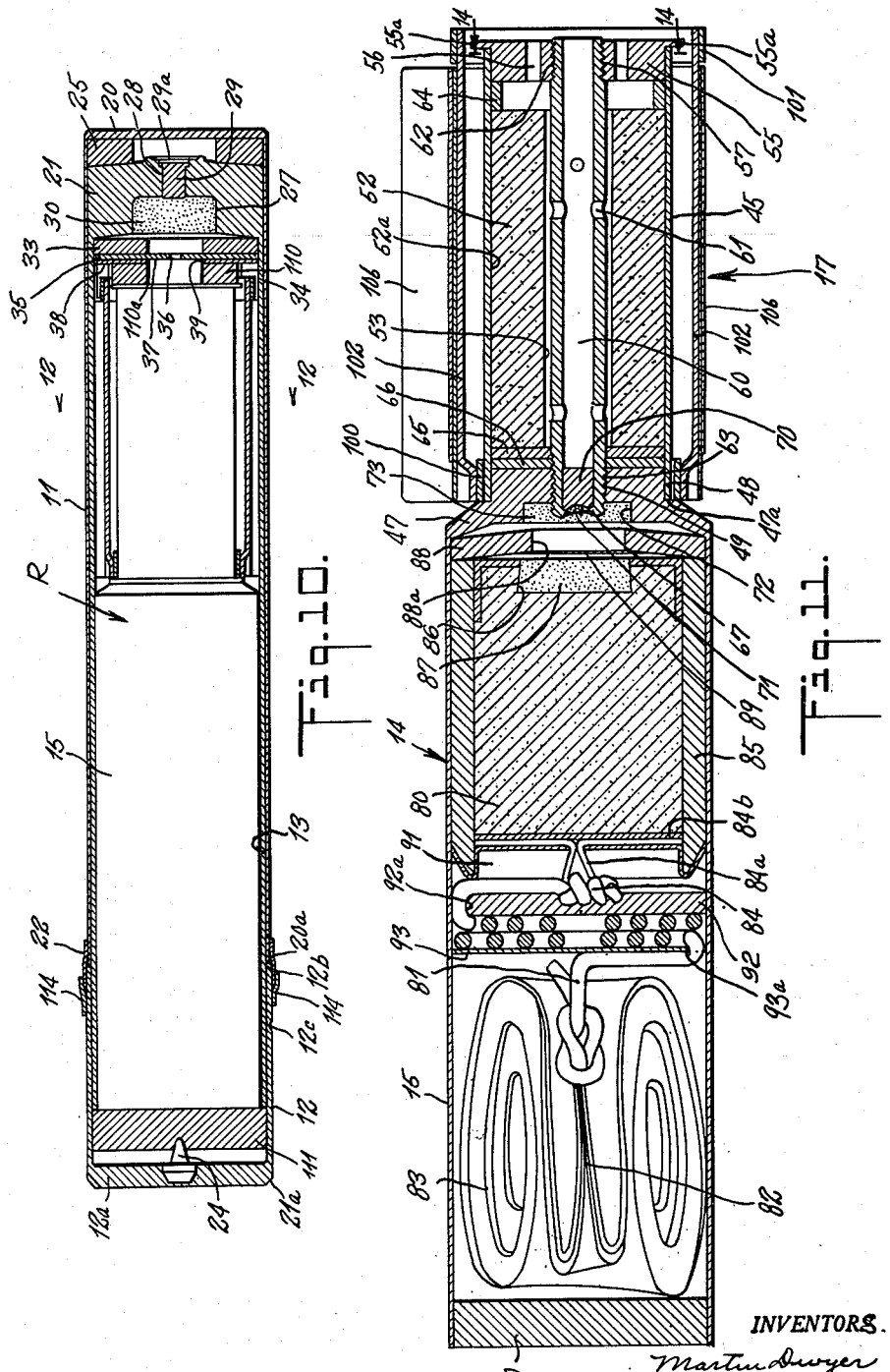

Aug. 15, 1950

M. DWYER ET AL 2,519,123

HAND OPERATED ROCKET TYPE DEVICE FOR
SIGNALING AND OTHER PURPOSES

Filed July 10, 1947

INVENTORS.
Martin Dwyer
BY Ralph Anzalone
Kenyon & Kenyon
ATTORNEYS

Patented Aug. 15, 1950

2,519,123

UNITED STATES PATENT OFFICE 2,519,123

HAND-OPERATED ROCKET TYPE DEVICE FOR SIGNALING AND OTHER PURPOSES

Martin Dwyer, Hewlett, and Ralph Anzalone, Baldwin, N. Y.

Application July 10, 1947, Serial No. 759,990

10 Claims. (Cl. 42—1)

This invention relates to rocket-motor propelled devices and more particularly to a hand-operated rocket type of device adapted for use in emergencies and which may be discharged from the hands of the user without the use of any weapons, or other auxiliary equipment of any kind.

Heretofore, so far as is known rocket-motor propelled signalling devices such as rocket-propelled flares or signals have required the use of discharging weapons such as pistols, guns, or other auxiliary equipment in order to secure a sufficient elevation of the signalling flare. Frequently, especially when emergencies have arisen, equipment for discharging a rocket of this kind has been lacking and in consequence the available signalling devices without such equipment have been entirely useless.

A principal object of this invention is to provide a signalling device of the so-called rocket type that may be conveniently and safely discharged from the user's hands or with the aid of other parts of his body such as head, knee or shoulder in emergencies without requiring any auxiliary weapons, such as pistols, guns or launching devices.

Another principal object of this invention is to provide rocket-motor propelled devices that may be conveniently and safely discharged by a launching operator as just described and projected to a point remote from the operator, to there eject elements carried thereby, such as signals, illuminating devices, displays, radar aiding and blocking devices, insecticides, messages, photographs, drawings, sketches, maps, information, defensive or offensive weapons, rescue devices such as a deflated life preserver with an attached container of compressed carbon dioxide arranged automatically to be opened to inflate the preserver after ejection, and any other types of elements capable of being carried in the discharged rocket-motor propelled device for ejection at the desired point away from the launching operator.

Another object of the invention is to provide signalling and other rocket-motor propelled devices of the character described, each of which may be assembled as a unit and distributed for use in required quantities, for example, to aircraft and ships for storage in lifeboats, life rafts or other life-saving apparatus, and which are comparatively small in size, convenient to handle and store, safe to store, and which are made of materials that are cheap enough to permit discarding of used parts thereof after a single use if desired.

Another object of the invention is to provide structures of the character described that are comparatively simple to assemble and to manufacture and that may be manufactured rapidly and quantitatively.

Still another object of the invention is to provide signalling and other rocket-motor propelled element containing devices of the character described, each of which is entirely self-contained and self-sealed against deterioration over long periods of time and each of which is instantaneously ready for use when need for such use arises.

In general, a device embodying the invention includes an outer protective casing and a separate or separable removable cover or cover part therefor. These are joined by a hermetic sealing arrangement that may be broken for use. The contents of the container and its cover or cover part are a rocket-motor propelled signalling or element containing assembly removable as a unit from the outer casing for use. Since the assembly can have other elements besides signals therein as hereinbefore and hereinafter noted, it can be denoted more generically as a rocket-motor propelled element-containing assembly. In such definition "element" is intended to include any of the elements noted in the objects of invention hereinbefore set forth. The rocket-motor propelled, element-containing assembly includes a primer or detonator. When the assembly is to be put into use, the sealing arrangement is broken and the assembly is removed from the protective casing as a unit. The cover is then mountable on a portion of the assembly in proximity to the primer and bears a member which will explode the primer when the cover is struck sharply by one hand or other body portion of the user or launcher while the latter grasps another portion of the assembly with the other hand. The explosion of the primer or detonator acts on an expelling charge to fire the latter and to expel a rocket-motor propelled signalling or element-containing device from the assembly. The firing of the expelling charge functions to ignite the rocket-motor driving charge and the latter elevates or projects the signalling or element-containing device to a desired elevation or point away from the launcher. At that time the element contained in the rocket-motor propelled device is expelled from the rocket-motor propelled parts. If this element is a signal with a parachute, this signal is expelled together with the attached parachute from the rocket-motor propelled parts. The descent of the signal is slowed or retarded by the parachute. If the signal is a pyrotechnic candle, the latter is automatically ignited just prior to its expulsion from the rocket-motor propelled parts. If other elements with or without parachutes are contained instead of a parachute attached signal, such elements are discharged after the rocket-motor propelled element-containing device has been projected to desired points away from the launcher.

The rocket-motor propelled device is provided also with flight guiding means which automatically assumes a flight guiding position upon expulsion of the device from the assembly. Suitably delaying arrangements are provided in the signalling device to provide appropriate ignition times, during flight of the device to effect the foregoing sequence of operations after the primer has been exploded as described.

While the invention hereinafter will be described most particularly with respect to a rocket-motor propelled device embodying a specific type of signal attached to a parachute, it is to be understood that elements such as those outlined above and hereafter may be substituted for the specific type of signal described.

To the accomplishment of the foregoing and such other objects as may hereinafter appear, this invention consists in the novel construction and arrangement of parts hereafter to be described and then sought to be defined in the appended claims, reference being had to the accompanying drawings, forming a part hereof, which show merely for the purposes of illustrative disclosure preferred embodiments of the invention, it being expressly understood, however, that changes may be made in practice within the scope of the claims without digressing from the inventive idea.

In the drawings, in which similar reference characters denote corresponding parts and in which sectional views are seen in the direction of the arrows:

Fig. 1 is an elevational view of a completely assembled device embodying the invention in one form of outer casing and cover and as the device is intended to be stored ready for use;

Fig. 2 is an elevational view on an enlarged scale of the rocket-motor propelled element-containing assembly shown removed from the outer casing;

Fig. 3 is an elevational view of the actual rocket-motor propelled element-containing device that is discharged from the assembly shown in Fig. 2 as it appears in flight;

Fig. 4 is an elevational view of one possible type of element, namely, a signal and parachute assembly that is ultimately discharged from the device of Fig. 3 when the latter has achieved the desired elevation or distance away from the launcher after discharge of the latter from the assembly of Fig. 2 with the parachute in collapsed condition;

Fig. 5 is an elevational view, partially in section of the removable cover of Fig. 1, showing in detail the firing member thereon which is designed to explode the primer of the assembly of Fig. 2;

Figs. 6, 7, 8 and 9 are diagrammatic illustrations of the sequence of events that occur when the cover with its firing member is applied to the rocket assembly of Fig. 2 and struck by hand to fire the primer;

Fig. 10 is a longitudinal sectional view on an enlarged scale taken along line 10—10 of Fig. 1;

Fig. 11 is a longitudinal sectional view on an enlarged scale taken along line 11—11 of Fig. 3;

Figure 17:
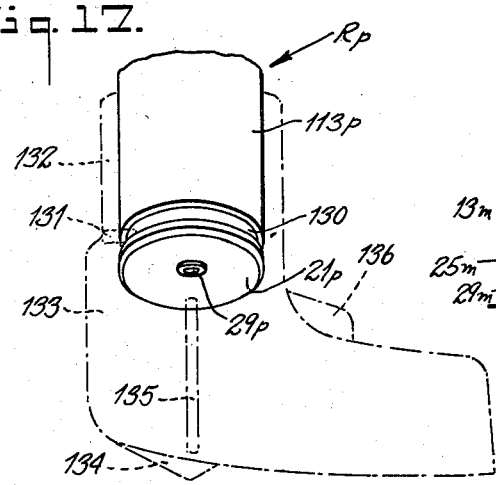
Figures 15, 16:
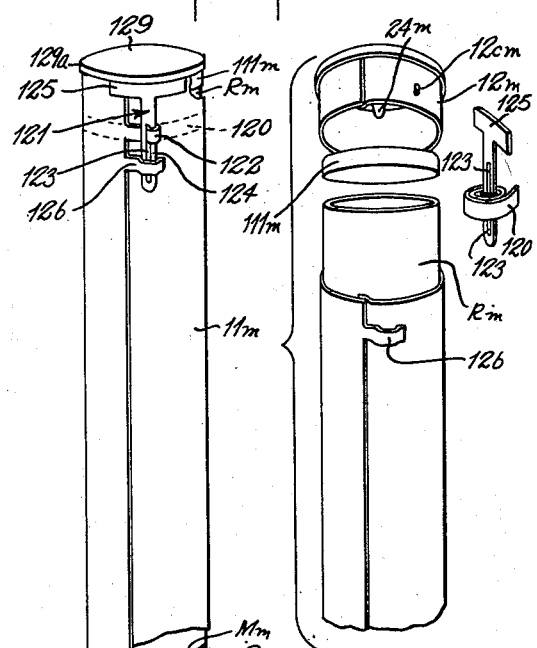
Fig. 15 is a perspective view of a modified form of outer protective casing that may be used to enclose the rocket-motor propelled element-containing assembly.

Fig. 16 illustrates in part and in perspective the appearance of the outer protective casing of Fig. 15 and its contents after the sealing arrangement has been broken and a cover part or portion of the outer casing has been removed to expose the casing's contents; and Fig. 17 is a fragmentary perspective view of that portion of a modified form of construction of the casing from which the rocket-motor-propelled, element-containing device is to be discharged shaped to render the device dischargeable from a mechanical launching weapon such as a pistol or gun as well as by hand, and illustrates diagrammatically the manner of mounting the device for discharge from the pistol or gun.

Referring to the drawings and first to Figs. 1–5 inclusive, 10 denotes generally a complete arrangement constituting the subject matter of this invention. This arrangement 10 comprises generally an outer casing 11 including a removable portion or cover part 12 for the outer casing, and a rocket-motor propelled signalling or element-containing assembly R. The assembly R includes a first inner casing 13, and a rocket-motor propelled signalling or element-containing device 14, the latter including an upper casing 15, adapted to receive a signal and parachute assembly 16 or others of the elements described. The device 14 also includes a tail assembly 17, all as will be presently described in detail.

The outer casing 11, in the embodiment shown in Figs. 1 and 10, is a tube preferably of metal such as aluminum, or other suitable material that will satisfy the requirements of longevity and resistance to damage by the elements in the storage locale. This outer casing 11 is closed at one end 20 and is open at the other end for purposes of receiving the assembly R. The outer casing 11 is shorter in length than the assembly R so that the latter projects outwardly thereof and receives the cover 12 which is preferably of the same material as casing 11.

The first inner casing 13 of assembly R, as shown in Figs. 2, 6 and 10, is also preferably of metal of the same kind as that used for the outer casing 11. This inner casing 13 likewise is a tube closed at one end 21 and open at its opposite end 21a. The inner casing 13 is admeasured in diameter to fit telescopically and fairly snugly within the outer casing 11. The first inner casing 13 is substantially longer than the outer casing 11 so that it projects beyond the outer casing end 20a (Fig. 10) when the assembly R is inserted into the outer casing 11 for a substantial distance for several purposes. The projecting portion serves as a convenient mount for cover 12 and also facilitates removal of the assembly R from the outer casing 11 when it is desired to use the assembly R.

The cover 12, which is preferably of the same material as the casings 11 and 13, is closed at one end 12a (Figs. 5, 6, 7 and 10). It is admeasured to fit snugly over the outwardly projecting portion of the inner casing 13 when the latter lies in outer casing 11. Its end 12b then abuts the edges of the open end 20a of the outer casing 11. In addition, detents or indentations 12c are provided in the wall of cover 12 for frictional gripping purposes when it is mounted on either end of assembly R (see Figs. 5, 6 and 10). An annular collar 22 is secured to casing 11 adjacent its open end 20a so as to form an overhanging annular flange. The flange functions to guide and helps to retain the cover 12 snugly in place as described. A firing pin or member 24 is secured to the closed end 12a of the cover 12 and projects inwardly thereof for purposes presently to be described. Preferably this pin 24 is centrally located.

In assembling the outer casing 11, the cover 12 and assembly R, the closed end 21 of the inner casing 13 is inserted into the outer casing 11 so that it ultimately lies adjacent the closed end 20 of the outer casing 11 (Fig. 10). A ring-like cushion 25, however, is first inserted into the outer casing 11 to prevent intimate contact between the ends 20 and 21 of the two casings. This cushion 25 is preferably of felt or other soft material and is designed to function as a shock absorber to prevent untimely discharge of the contents of assembly R as will presently be described.

The closed end or wall 21 of the first inner casing or rocket barrel 13, in the embodiment shown in Fig. 10, preferably is thickened and this wall 21 has a recess 27 and a longitudinally extending bore 28 of reduced diameter extending from the recess 27 entirely through the wall 21. A primer or cartridge or detonator 29 of conventional type, for example, a W. R. A. Mark V primer is inserted into the bore 28. This primer is of the type that is adapted to be exploded when struck by a firing pin. Preferably the primer is of the so-called center fire type and will not be discharged unless such a firing pin strikes accurately the center of the exposed end 29a of primer 29. The primer 29 is secured in place in the bore 28 preferably by a press fit with its end 29a facing outward. Prior to its insertion, the walls of the primer 29 may be coated with a protective adhesive coating which functions both as a seal and a securing means for maintaining the primer fixedly within the bore 28.

An expelling charge 30 (Fig. 10) is carried in the recess 27. This charge may be of any desired composition and should be in sufficient quantity to effectively expel the rocket-motor propelled signalling or element-containing device 14 from the rocket barrel or first inner casing 13 to a safe elevation away from the user, and at sufficient speed to provide stabilizing airflow past the flight guiding tail assembly 17 before jet action of the main propelling charge of the rocket-motor presently to be described takes over the function of propelling the expelled device 14. In practice a safe distance or elevation is of the order of 20 or 30 feet. In the embodiment shown, approximately 1.2 gram of FFFF black powder charge has been found to be sufficient. The particular explosive for the expulsion charge 30 can be of any desirable composition in sufficient quantity to secure the expulsion at proper speed of the device 14 to the desired safe elevation. Black powder is a mixture of 62–75% potassium nitrate, 10–19% sulphur and 12–5% charcoal. The letters FFFF represent a commercial grade of such black powder but any suitable grade can be used.

A washer 33 (Fig. 10) is carried in the rocket barrel to overlie the expelling charge 30. This washer preferably is of felt or similar material. This washer has a central opening 34 coaxial with but of smaller diameter than recess 27. A metallic washer 35 is carried in the rocket barrel 13 in contact with the washer 33. The washer 35 has a small opening or orifice 36 whose diameter is smaller than that of the opening 34. The opening 36 is normally closed, for example, by a disk 37 of readily combustible material, such as tissue paper or the like, which is adhered in any desired way to the exposed face of the metallic washer 35. A retaining washer 38 made, for example, of chip board, boxboard, cardboard or other desired material is carried in the barrel 13 in contact with the tissue paper bearing side of the metallic washer 35. This washer 38 has an opening 39 axially aligned with the openings 36 and 34 and preferably is of substantially the same diameter as the opening 34. The washer 38 frictionally engages the inner wall of barrel 13 and keeps the other washers 33 and 35 in place over the charge 30.

The rocket-motor driven signalling or element containing device 14 which is carried in the barrel 13 (see Figs. 3 and 11) comprises the upper tubular carrier 16 and a lower tubular carrier or motor tube 45 on which tail assembly 17 is mounted as will be presently described. The motor tube 45 is of metal or any other suitable material and preferably of stainless steel or other high heat-resisting metal and the upper tubular carrier 16 also of any suitable material is preferably of aluminum. The motor tube 45 is of smaller diameter than the upper tubular carrier 16 and is adapted to be joined to the latter conveniently as will be described. As seen best in Fig. 11, the diameter of the end wall 47 of the carrier 16 is reduced in a portion and the end 48 of the motor tube 45 abuts a shoulder 47a defined by the reduced portion of the end wall 47. The end wall 47 of the upper carrier 16 has a threaded bore 49 extending entirely through it for purposes presently to be described.

The motor tube 45 (Fig. 11) serves as a receptacle for the rocket-motor propelling charge 52 of grain or pellet form. This pellet or grain form of charge 52 functions to elevate the rocket-motor driven device 14 to the desired height after it has been discharged from the rocket barrel 13 by the expelling charge 30 as will presently be described. While the rocket-motor propelling charge 52 may be of any conventional kind, in the embodiment shown, it has the form of a pressure molded substantially solid tube or pellet whose dimensions are such as to permit it to be inserted as a unit into the motor tube 45. This pellet, if solid, has a central bore 53 that is axially aligned with the threaded bore 49. This pellet 52 can be of any suitable composition such as black powder, smokeless grain or the like.

The presently preferred composition has been molded under a pressure of approximately 10 tons per square inch into the solid form shown. The molded pellet 52 preferably is coated externally with a waterproofing coating 52a such as iron oxide in natural resin base cement or any other suitable coating compound. Any good preservative coating can be used. The surface of the bore 53 of the pellet preferably is not so coated. If desired, the pellet 52 can also be covered with paper, fabric, fiber glass, or other protective and, or, fire retarding coating, and, or vibration damping coating and, or, any other type of coating which can be affixed by an adhesive, shrinkage, or by any other suitable ways.

The charge 52 described is merely exemplary and no limitation regarding it is made. It can be of any kind of material that will effectively propel the device 14 for the desired distance at desired speed.

A jet plug 55 is mounted in the outermost end of the motor tube 45, for example, by a tight press fit. This jet plug is of heat-resisting metal and preferably is of cadmium plated steel. A plurality of jet orifices 56 arranged in any desired manner, and in any desired number in the jet plug 55, function to permit expulsion of the gases generated by combustion of the charge 52 for propulsion purposes when the latter is ignited as will presently be described. A threaded bore 57 that in assembly of tubes 15 and 45 lies in axial alignment with the threaded bore 49 is provided in the jet plug 55. The threaded bore 57 extends entirely through the jet plug 55.

A tubular timing ferrule 60 threaded at its opposite ends is provided. This ferrule is of heat-resisting metal and preferably of stainless steel. A plurality of lateral vents 61 are provided along the length of the ferrule. One threaded end 62 of the ferrule is screwed into the bore 57 of the jet plug 55 so that the ferrule 60 projects inwardly of the motor tube 45 in the axial direction of the latter and so that the opposite threaded end 63 of the ferrule may be screwed into the bore 49 in the end wall 47 of the upper tubular carrier 15. It will be noted that when so arranged the ferrule passes through the bore 53 of the motor pellet 52 and that the vents 61 all lie in the portions of the ferrule that are surrounded by the motor pellet 52. A spacing ring 64 of desirable material, such as asbestos, metal or any other appropriate material, and an asbestos insulating washer 65 located at opposite ends of the pellet or charge 52 and surrounding the ferrule 60, function to position the motor pellet 52 with respect to the vents 61 of the ferrule and keep the pellet from moving within the tube.

The motor pellet 52 spaced by the ring 64 and washer 65 is retained within the motor tube 45 by a disk 66 of metal such as aluminum or other suitable material which is inserted into the motor tube 45, for example, by a press fit after the other contents of tube 45 have been inserted. The threaded end 63 of the ferrule projects beyond this disk 66 so that it can be screwed into the bore 49. Adjacent the threaded end 63 of the ferrule 60, the internal diameter of the latter is reduced to provide a restricted orifice 67 that opens into the threaded bore 49.

A time mixture or fuse compound 70 of suitable kind is carried in the ferrule adjacent to the restricted orifice 67. This mixture, for example, can consist of slow black powder. Other fuse mixture can be used. This compound 70 is loaded into the ferrule under a pressure of a ram, for example, 1800 pounds total force on the ram and functions as a fuse as will be described to delay expulsion and ignition of the signal and parachute assembly 16 or other element content from the upper tubular carrier 15 as will presently be described. A small amount of granulated faster black powder or other priming mixture 71 is loaded under a pressure of about 25 pounds total force into a cavity provided in the fuse compound or timing mixture 70 adjacent to the outlet 67 and through the latter.

It will be noted that when the threaded end 63 of the ferrule is screwed into the bore 49 in the end wall 47 of the upper tubular carrier 15 that the sealing disk 66 abuts the face of the end wall 47 and because of the spacing arrangements provided by disk 66 and the ring 64 and washer 65 all the internal contents of the motor tube 45 are held in non-displaceable position. The threaded ends 62 and 63 preferably are coated with sealing compound prior to being screwed into the threaded bores 57 and 49 to provide permanent joints. The end 63 extends into a recess 72 provided in end wall 47 of carrier 15. This recess is loaded as will be presently described with a black powder expelling charge 73.

The uppermost tubular carrier 15 is adapted to receive the signal and parachute assembly 16 or other of the elements previously described. The element shown particularly in Figs. 11, 6 and 8 is a signal and parachute assembly 16. It is to be understood that any of the other elements hereinbefore described that can be expelled when the assembly 14 has been projected to the desired point away from the launcher can be loaded in the tubular carrier 15.

The particular element, namely, signal and parachute assembly 16, in the embodiment shown in Figs. 11, 6 and 8, includes a solid cylindrical block or pyrotechnic candle 80 of a pyrotechnic compound. This compound either may be of the kind which when ignited emits voluminous smoke for daytime signalling or of a type which when ignited emits brilliant light of desired color for night signalling purposes. This pyrotechnic candle 80 is joined, for example, to a parachute cord 81 which consists preferably of asbestos cord reenforced by wire in the length of which, if desired, a swivel 81a is interposed. The cord 81 is attached also to the shrouds 82 of a parachute 83. The parachute 83 preferably is of the baseball type that may be made of paper or other readily foldable material which enables it to be folded and inserted in compressed and folded condition into tubular carrier 15. In the embodiment shown, the parachute cord 81 is secured to the pyrotechnic candle 80 by having a knot 84 thereon tied to a cotter pin 84a mounted on the pyrotechnic candle 80 above a disk 84b. The pyrotechnic candle 80 is surrounded by a wrapping or plurality of wrappings of protective material 85. This protective wrapping 85 may consist of boxboard or cardboard adhered to the candle 80 by an adhesive. If multiple layers of wrappings are used, these are adhered to each other as well. Any suitable adhesive, such as flour paste, glue or other cementitious material is used for both purposes. The thickness of the protective wrapping material 85 is sufficient and should provide adequate protection for the candle 80 in transit prior to assembly in the device and also is admeasured so that the candle 80 with its wrapping of protective material 85 will fit within the upper tubular carrier 15.

A pyrotechnic pellet or ignition disk 87 is incorporated in the pyrotechnic candle (Fig. 11), This pellet 87 comprises combustible material whose ignition temperature is lower than that of the pyrotechnic candle itself. It may be compressed black powder for example. It functions to facilitate the ignition of the pyrotechnic candle when the flame propagated by the fuse compound mixture 70, and expelling charge 73 as will be described, reaches the pellet 87 after the rocket-motor pellet 52 has driven the rocket device 14 to a desired elevation. The pellet or disk 87 is permanently adhered to candle 80 in recess 86. A cover disk 91 of metal or the like secured at the opposite end of candle 80 holds the cotter pin 84a in place on the candle 80.

The signal and parachute assembly 16, or other element is inserted into the uppermost tubular carrier after the expelling charge 73 has been loaded into the recess 71. In the embodiment shown, the expelling charge 73 comprises approximately 0.5 gram of FFFF black powder. The quantity of this charge should be sufficient to expel the element contents of the upper tubular carrier 15 effectively when it is exploded as will be presently described. Any effective expelling charge in necessary amount may be used. After the expelling charge 73 has been loaded into the recess 71, a shock-absorbing and charge retaining ring 88 is inserted into the carrier 15 (Fig. 11). This ring or washer may be of felt or other suitable material. Its opening 88a is covered by a thin disk 89 of readily combustible material such as tissue paper that is adhered permanently to the ring 88. The ring 88 fits frictionally within the carrier 15 and keeps expelling charge 73 confined. After the ring 88 has been inserted, the signal and parachute assembly 16 or other element is inserted into the uppermost tubular carrier 15 as shown in Fig. 11 with the pellet 87 facing the orifice or outlet 67 of the ferrule 60. Thereafter a retaining plug or disk 90 is inserted into the outermost end of the tubular carrier 15. This sealing disk is of cork or other equivalent material and functions to retain the contents of the upper tubular carrier 15 therein and to seal them against atmospheric conditions. It will be noted that the parachute 83 is protected from the heat generated by any leakage gases resulting from the explosion of the expulsion charge 73 by a disk 92 of felt and a further disk 93 of chip board or the like lying between the parachute 83 and the pyrotechnic candle 80. The parachute cord 81 in assembly is folded conveniently so that most of its folded portions lie between the disks 92 and 93. It is understood, of course, that appropriate openings 91a, 92a and 93a are provided in disks 91, 92 and 93 for the threading therethrough of the necessary portions of the parachute cord 81.

Figure 12:
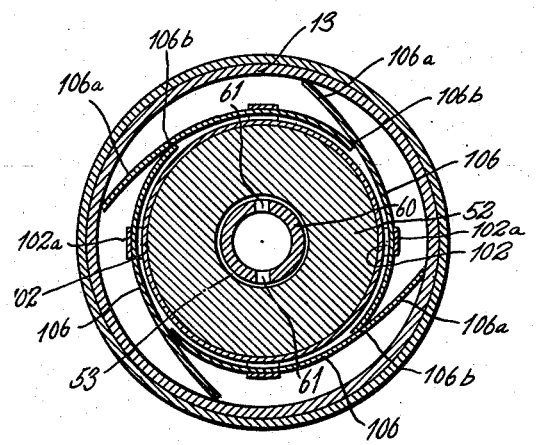
Fig. 12 is a transverse sectional view on an enlarged scale taken along line 12—12 of Fig. 10 and illustrating the collapsed position of the flight guiding means prior to the use of the device.
Figure 13:
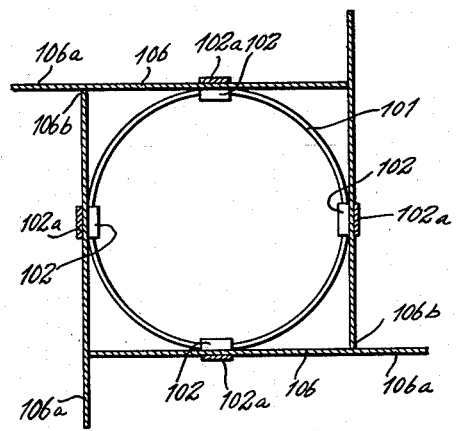
Fig. 13 is a transverse sectional view on an enlarged scale taken along line 13—13 of Fig. 3 and illustrating the position that guiding vanes of the guiding means assume on discharge of the rocket-motor propelled element-containing device from the assembly of Fig. 2.
Figure 14:
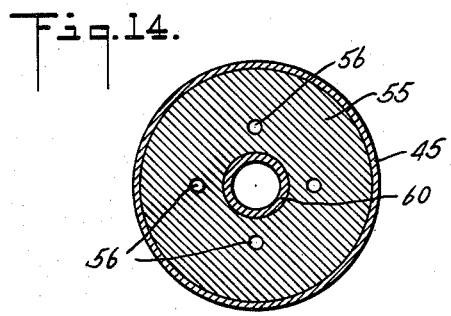
Fig. 14 is a transverse sectional view also on an enlarged scale taken along line 14—14 of Fig. 11 illustrating certain details of the rocket-motor propelling mechanism used to elevate or propel the rocket-motor element-containing device after its initial discharge from the assembly of Fig. 2.

In order to guide the flight of the rocket-motor propelled signal or element-carrying device 14 after its expulsion from the rocket barrel 13, the tail assembly 17 is provided. Any suitable flight guiding means may be used. In the embodiment shown, the tail assembly 17 is mounted conveniently externally of the motor tube 45 (Fig. 11). The tail assembly 17 includes a pair of rings 100 and 101 (Fig. 11). These rings are of metal and preferably of steel. The ring 100 is admeasured in diameter to slide along the outer surface of the motor tube 45 while the ring 101 is of sufficiently large diameter to clear the flange 55a of the jet plug 55. The two rings 100, 101 are joined by a plurality of longitudinally extending ribs 102 (Figs. 11, 12, 13). These ribs are likewise of metal and preferably of steel. In the embodiment shown, such ribs 102 are equi-angularly spaced with respect to the peripheries of the two rings 101 and 102, are secured at their opposite ends to the respective rings, for example, by spot welding at 103 and 104 (Fig. 3). When so secured these rings 100 and 101 and ribs 102 provide a rigid frame that is displaceable longitudinally along the surface of the tubular member 45 between the limits of movement permitted to the ring 100 by the shoulder 47a of wall 47 and the flange 55a of the jet plug 55 (Fig. 11).

Tail fins 106, preferably of spring steel, are secured one to each of the ribs 102 (Figs. 11, 12, 13). Reenforcing ribs 102a overlie fins 106 and are parallel with ribs 102. The joints between each fin 106 and ribs 102, 102a are, for example, by spot welds 105 (Fig. 3). The tail fins 106 (Fig. 3) are each substantially rectangular in shape and the welded joints 105 of each with one set of the ribs 102, 102a is made along a longitudinal axis parallel with the longer sides of the fin and lying to one side of the longitudinal center line of such fin. As a result, as shown in Fig. 13, the unflexed or flight position of the vanes or fins 106 provides an overhang 106a with respect to the abutting edge 106b of the next adjacent fin or vane. As a result, these overhanging portions 106a constitute the principal flight-guiding portions of the tail assembly 17 in the flight of the rocket-motor propelled signal or element-carrying device 14. When the device 14 is inserted into the rocket barrel 13 the vanes or fins 106, being of flexible material, are readily deformable and assume the curvilinear shape shown in Fig. 12. Because of their spring-like nature, the outermost edges of the portions 106a maintain a frictional engagement with the inner wall of the rocket barrel 13 and help to move the tail assembly 17 along the motor tube 45 toward the outer limit permitted the ring 100 by the flange 55a. The movement is completed after the device 14 is completely ejected from the rocket barrel 13 by inertia and air resistance. As a result, after the ejection of the device 14, as shown in Fig. 7, the tail assembly 17 assumes the position shown in Fig. 7 and the vanes or fins 106 then assume the position shown in that figure and Fig. 13.

Before inserting the rocket-motor propelled device 14, bearing the tail assembly 17 just described, into the rocket barrel 13, a fin thrust protector or cushion 110 (Fig. 10) is interposed between the washer 39 and the jet plug 55. This fin thrust protector 110 comprises one of more disks of chip board or other suitable shock-absorbing material. The protector 110 functions as a shock absorber. The center openings 110a of these disks 110 are aligned with the bore of the ferrule 60 and with the opening 36. After the device 14 is inserted into the barrel 13, the latter constitutes assembly R which is then ready for insertion into the outer casing 11. This assembly R is inserted into the outer casing 11 so that the end of barrel 13 bearing primer 29 rests on the cushion 25, which is first inserted into the outer casing 11. The removable cover 12, bearing the firing pin 24, is then mounted on the outer casing 11. Just prior to such mounting, a protective disk 111 of wood, cork or any suitable material is inserted in the cover 12 (Fig. 10). This disk 111 functions to protect the pin 24 and also to prevent longitudinal displacement of the contents of the casing 11. The cover 21 is hermetically sealed to the outer casing 11 in any convenient manner, for example, by application of a removable sealing band 114 (Figs. 1 and 11) of any desirable material, for example, cellulose tape having a pressure-sensitive adhesive on one face. The complete assembly R sealed within the outer casing 11, as seen in Fig. 1, is now ready for shipment and storage ready for use when needed.

In operating the device when an emergency arises the seal 114 is broken, the cover 12 removed, and the assembly R with its contents is lifted from the outer casing 11 which latter is then discarded. The launcher then grasps the assembly R with one hand so that the forefinger and thumb of that hand lie upon the knurl mark M. The knurl of mark M is useful as a guide to the assembler and launcher. This mark M is particularly useful to aid the user or launcher in properly positioning the cover 12 on the assembly R for firing purposes in the dark when it cannot be seen but can be felt. The cover 12 is then mounted by the other hand over the primer-bearing end 21 of the rocket barrel 13 of the assembly R until the edge 12b of the cover strikes the thumb and forefinger, that is until this edge 12b is substantially aligned either by feel or by sight with the mark M. When so mounted the firing pin 24 is spaced from the end of the primer 29 as seen in Fig. 6 but is in a position to strike the primer 29. The operator then grasps the rocket barrel 13 with one hand as shown in Fig. 6 and with his other hand strikes the cover 12 sharply so that the firing pin 24 hits the primer 29 to explode it. Of course, instead of using his other hand he may strike the bottom of the so-mounted cover 12 on his head, knee, shoulder or other body part or on any solid body to drive the firing pin 24 against the primer 29 to explode it. This explosion of the primer 29 ignites the expelling charge 30 which explodes. The force of this explosion is sufficient to expel the rocket-motor propelled element or signal-containing device 14 from the barrel 13 to a distance of approximately 20 or 30 feet or other safe distance away from the user (Fig. 7). Some of the flame propagated by the explosion of the expelling charge 30 while the device 14 is still in barrel 13 burns through the tissue disk 37 and enters the timing ferrule 60 through orifice 36 before the device 14 is completely expelled from the rocket barrel 13. This flame passes through vents 61 and ignites the rocket-motor charge 52 and also ignites fuse compound 70. As a result of such ignition of the rocket-motor charge 52, by the time the rocket device 14 achieves its initial expulsion height or distance of 20 to 30 feet away from the launcher, the combustion of the rocket-motor charge 52 is sufficiently advanced to insure jet propulsion of the rocket device 14 to its ultimately desired height or distance of several hundred feet or further by reason of the expulsion of the rocket propulsion gases generated by the burning of the rocket-motor charge 52 rearwardly through the jet plug orifices 56. Before the rocket device 14 has achieved its ultimately desired height or distance as a result of such jet propulsion, either heat and flame propagated by explosion of the expulsion charge 30 or those resulting from the burning of the motor pellet 52 will have ignited the fuse compound 70. This fuse 70, whose combustion has thus been started before the rocket device 14 has reached its ultimately desired height or distance, burns just about that time igniting the black powder 71 and the expelling charge 73 which explode. These explosions expel the contents, either an element such as those described herein or the signal and parachute assembly 16 from the upper tubular carrier 15, driving the element 16 out together with the sealing plug 90 (Fig. 8). At the same time if the element is the signal and parachute assembly 16 described, these explosions ignite the pellet 87. This starts combustion of the pyrotechnic candle 80 of the assembly 16 which then begins to burn and fall freely toward the ground. The parachute 83 which is attached to the candle 80 by cord 81 at this time opens (Fig. 9) and retards the descent of the burning candle sustaining the latter above the ground for a sufficient length of time for the signal to burn itself out. The cord 81 and shrouds 82 are of sufficient length to prevent the parachute 83 from burning. If the swivel 81a is included in cord 81, the candle 80 may rotate as it descends.

The explosion of primer 29 initiates all actions described. As long as the assembly R is in outer container 11, the primer 29 cannot be exploded because it is remote from firing pin 24 and because the cushions 25 and 111 prevent shock to the primer 29.

The explosion of expelling charge 30 initiated by the primer explosion and the ejection of the rocket-motor propelled signal or other element-containing device 14 from the rocket barrel 13 as a result is so fast that the heat generated by the explosion of charge 30 does not reach the portions of barrel 13 grasped by the user's or launcher's hand.

The outer container 11 and cover 12 heretofore described, may be modified in various ways. One such modification is illustrated in Figs. 15 and 16. Therein the tubular cylinder or container 11m which is preferably of metal or other suitable material, has an overall length that is slightly longer than or equal substantially to the combined overall assembled length of container 11 and cover 12 of Fig. 1. Intermediate its length, at approximately a point corresponding to the junction of the container 11 and cover 12 of Fig. 1, the container 11m has an annular tear strip portion 120 that may be removed by a key 121. The tear strip 120 has a loop portion 122 which extends into a slot 123 in the key 121 and which is also looped about a portion 124 of the key 121 adjacent to the slot. The slot 123 extends in parallellism with the longitudinal axis of the container. A cross arm 125 is provided on the key 121 for a purpose presently to be described. A clamp 126 is secured to the container 11m and functions to aid in locking the key 121 against sliding or accidental rotation prior to use. An end of the container 11m is provided with a conventional cover 127 which is secured by a hermetic seal permanently to the cylinder 11m in usual manner as by beading and soldering at 128.

The other cover 129 which ultimately is secured hermetically to the opposite end of cylinder 11m as by beading and soldering at 129a after the cylinder 11m has been loaded with an assembly Rm, has a firing pin 24m secured to it in substantially the same way as firing pin 24 is secured to cover 12. In manufacturing procedure, a disk 25m of felt or the like corresponding to disk 25 is inserted into a container 11m to lie against the cover 127 previously assembled with the container 11m. An assembly Rm corresponding to the assembly R is then inserted into the container 11m through the key bearing end of container 11m with its primer bearing end 21m first. A disk 11m corresponding to disk 111 of Fig. 10 is then inserted into container 11m over the opposite end of assembly Rm. The cover 128 bearing firing pin 24m is then applied to the open end of container 11m. The slot 123 of the key 121 is so positioned that at this time the headed end 124 of key 121 lies in abutment with the shoulder or bead 129 defined by the hermetically sealed joint between cover 128 and container 11m. The clamp 126 presses the key 121 snugly against the outer wall of the container 111m in this described position so that accidental operation of the key 121 is prevented. When such assembly is complete the assembly Rm lies within the container 11m in the same general relationship as assembly R lies in container 11 and cover 12 as shown in Fig. 10, i. e. with the primer 29m remote from the firing pin 24m. When it is desired to use the assembly Rm, the head 124 of the key is bent outwardly by the launcher to clear the bead 129. The key is then pulled or slid longitudinally, this being permitted by slot 123 until its other end lies clear of the clamp 126. Its head 124 is then rotated by hand to strip tear strip 120 from the container and to wind it about the key 121. That portion of the container 11m bearing the firing pin mounted cover 128 then becomes a separate cover part 12m (Fig. 16) corresponding to the cover 12. This cover part 12m is then removed from the assembly Rm. The assembly Rm is then withdrawn from the balance of container 11m. The cover part 12m is then mounted upon the primer bearing end 21m of the assembly Rm in identical way as cover 12 would be mounted thereon as seen in Fig. 6. Striking cover part 12m in the same way as has been described for cover 12 then causes its firing pin 24m to explode primer 29m and to initiate the same sequence of operations for the contents of assembly Rm previously described with respect to the contents of assembly R. The assembly Rm is to be considered as being substantially identical in construction with the assembly R previously described or to contain in its upper tubular carrier any of the elements previously described in place of signal and parachute assembly 16 contained in upper tubular carrier 15 of Fig. 11.

In some instances, it may be desirable to have the assemblies R or Rm adaptable for firing from a launching device such as a hand-held pistol or gun. Weapons of this type are known. Such weapons, for example, are illustrated in earlier U. S. Patents Nos. 2,344,957 and 2,397,114, both granted to Ralph Anzalone. In order to do this to the assemblies R or Rm, the primer bearing end of casing 13 or 13m thereof requires slight modification. Such a modification is shown in Fig. 17. In that figure the first inner casing 13p which corresponds to casings 13 or 13m has its primer bearing end provided with an annular groove 130. This groove is so positioned with respect to the primer-bearing end 21p that it can be gripped by the usual retainer or holder member 131 provided in a pistol or gun 132 to retain the casing 13m within the barrel 133 after the trigger-controlled hammer 134 of the gun causes its firing pin 135 to strike the primer 29p to explode it and to discharge the rocket-motor propelled device contained in casing 13p. Instead of being slightly convex like end 21 (Fig. 10), the primer-end 21p of casing 13p may be substantially flat as shown in Fig. 17. The contents of casing 13p otherwise are identical with those of container 13 to form a rocket-motor propelled assembly Rp which is like the assemblies R or Rm hereinbefore described. It is understood, of course, that the assembly Rp is preferably carried in a sealed container 11 and cover 12 or container 11m like those of Figs. 1 and 11 or 15 and 16 prior to use. Further the external diameter of the casing 13p of assembly Rm should be admeasured so that it may be inserted into the pistol or gun barrel 132 for discharge by the operation of trigger 136. The contents of assembly Rp likewise may be discharged by the cover 12 or cover part 12m in the same way as the contents of assemblies R or Rm by slipping such cover 12 or cover part 12m over the primer-bearing end of casing 13p and striking either as previously described instead of using the pistol 132 or other launching equipment.

The arrangements herein described provide rocket-motor propelled signalling or element-carrying arrangements which are self-contained and do not require auxiliary weapons, or launching devices for putting them into use, but which may also be discharged from weapons such as pistols or guns or other launching devices, if available, and if desirable. The arrangements provide devices that are always ready for instant use in emergencies for safe signalling purposes or for projecting needed implements or elements of the character outlined herein to a point remote from the launcher in a safe, rapid and satisfactory manner and are fully effective for the intended purposes whenever the need for such arrangements arises.

From the foregoing description, moreover, it can be seen that the arrangements described provide rocket-motor propelled signal or element-containing assemblies R, Rm or Rp that are hermetically sealed prior to use within outer enclosure means. The outer enclosure means may be a container 11 and separable cover part 12 joined together by strip 114 and separable upon removal of strip 114 or a unitary container 11m with weakened portion or tear strip 120 whose removal by key 121 separates a cover part 12m. The assemblies R, Rm or Rp within either type of enclosure means include a rocket barrel 13 or 13m or 13p bearing a primer 29 or 29m or 29p. Access to the primers 29, 29m or 29p for firing purposes is precluded until the outer assemblies R or Rm or Rp as the case may be have seen removed from either of the outer enclosure means. The primers 29 or 29m or 29p can then be exploded by first applying the removable cover part 12 or 12m as the case may be to the primer-bearing ends of the rocket barrels 13, 13m or 13p of the particular assembly removed. Then by causing firing pins 24 or 24m to strike the primers 29, 29m or 29p as the case may be, the latter can be exploded by concussion. As long as the assemblies R, Rm or Rp are within the particular outer enclosure means used they cannot be fired. The firing pins 24 or 24m can only be utilized after the assemblies have been removed from the outer enclosure means and after cover part 12 or 12m has been applied to the primer-bearing end of the rocket barrels 13, 13m, or 13p of the assembly removed.

While specific embodiments of the invention have been described, it is to be understood, of course, that variations in structural detail are possible within the scope of the claims and are contemplated. There is no intention, therefore, of limitation to the exact details shown and described.

What is claimed is

1. A self-contained device of the character described comprising complete outer enclosure including a separable cover part hermetically sealed together, a rocket-motor propelled element-containing assembly completely contained within said outer enclosure, said assembly including a rocket barrel, firing means for said assembly including a primer on said barrel, said separable cover part being mountable on said barrel in proximity to said primer only after the removal of said assembly from said enclosure, and a firing member on said separable cover part for exploding said primer by concussion after the removal of said assembly from said enclosure and after said separable part has been mounted upon said barrel in proximity to said primer.

2. A self-contained device of the character described comprising complete outer enclosure means including a separable cover part, removable sealing means for joining said separable cover part to the remainder of said enclosure means, a rocket-motor propelled element-containing assembly completely contained within and sealed hermetically within said enclosure means and including a rocket barrel and firing means for said assembly including a primer arranged on said barrel, said cover part being mountable on said rocket barrel in proximity to said primer only after the removal of said assembly from the enclosure means, and a firing member on said separable cover part for exploding said primer by concussion when said separable part is then struck sharply to drive said firing member against said primer.

3. A self-contained device of the character described comprising complete outer enclosure means including a separable cover part, a removable sealing member for joining said separable cover part to the remainder of said enclosure means until the device is to be used, a rocket-motor propelled element-containing assembly sealed hermetically in and completely contained within said enclosure means and including a rocket barrel and firing means for said assembly including a primer arranged on said barrel, said cover part being mountable on said rocket barrel in proximity to said primer only after the removal of said assembly from the enclosure means, and a firing member on said separable cover part for exploding said primer by concussion when said separable part is then struck sharply to drive said firing member against said primer.

4. A self-contained hand firing device of the character described for emergency purposes comprising an outer casing including a removable cover, a rocket-motor propelled assembly within said casing, said assembly being contained within a rocket barrel, firing means for said assembly including a detonator arranged at one end of said barrel, said outer casing and said removable cover providing a complete enclosure for said assembly, the latter being positioned in said outer casing with its detonator bearing end remote from said cover, and said removable cover being mountable on said rocket barrel in proximity to said detonator only after its removal from said casing, and a firing member on said cover for exploding said detonator when said cover is then struck sharply by hand.

5. A self-contained hand firing device of the character described for emergency purposes comprising an outer casing including a removable cover, removable sealing means for joining said cover to said outer casing prior to use of said device, a rocket-motor propelled assembly including a barrel completely contained within said casing and cover and firing means for said assembly including a primer positioned on an end of said barrel, said assembly being positioned in said outer casing with its primer bearing end remote from the cover bearing end of said casing and said removable cover being mountable on said barrel in proximity to said primer only after the removal of said barrel from said outer casing, and a firing member on said cover for exploding said primer when said cover is then struck sharply by hand.

6. In a self-contained device of the character described, an outer casing including a removable cover provided at one of its ends, a rocket barrel containing explosively dischargeable contents, firing means for discharging the contents of said barrel and including a primer positioned on an end of said rocket barrel, said outer casing and said removable cover providing a complete enclosure for said barrel and its contents, said barrel being positioned in said outer casing with its primer bearing end remote from the cover bearing end of said outer casing and said removable cover being mountable on the primer bearing end of said rocket barrel only after removal of the latter from said outer casing, and a firing pin on said cover positioned to strike and explode said primer when said cover has been positioned on said primer bearing end of said barrel and is then struck sharply.

7. In a self-contained device of the character described, an outer casing including a removable cover at one end thereof a rocket device completely contained within said outer casing, firing means for said rocket device including a primer, said rocket device being positioned within said casing with said primer remote from said cover and being removable as a unit from said outer casing for use, and a firing member on said removable cover mountable with said cover into proximity with said primer only after said rocket device has been removed from said outer casing, said firing member then serving to explode said primer when said cover is struck sharply.

8. In a self-contained device of the character described, an outer casing including a removable cover at one end thereof a rocket device completely contained within said outer casing, means for providing an hermetic seal between the cover and said outer casing to protect all the contents of the outer casing from atmospheric and climatic conditions until the rocket device is to be used, firing means for said rocket device including a primer, said rocket device being positioned within said casing with said primer located remote from said cover and removable as a unit from said outer casing for use after breaking of said hermetic seal and removal of said cover, and a firing member on said removable cover mountable into proximity with said primer only after said rocket device has been removed from said outer casing, said firing member then serving to explode said primer when said cover is struck sharply as by hand.

9. A self-contained device of the character described comprising complete outer enclosure means including a separable cover part, a tear strip joining said separable cover to the remainder of said enclosure means, means for removing said tear strip when the device is to be used, a barrel containing explosively dischargeable contents completely contained within and hermetically sealed within said enclosure means, firing means for said contents of barrel including a primer arranged on said barrel, said barrel being positioned in said enclosure means with the primer located remote from said cover part and said cover part being mountable on said rocket barrel in proximity to said primer only after the removal of said tear strip and the removal of said barrel from the enclosure means, and a firing member on said separable cover part for exploding said primer by concussion when said separable part is then struck sharply to drive said firing member against said primer.

10. A self-contained device of the character described comprising a unitary completely enclosing outer casing having a weakened removable portion to open said casing and to separate a cover part from one end thereof, a key connected to said weakened portion to facilitate its removal, means to prevent accidental operation or loss of said key, a barrel containing rocket-motor propelled elements, a primer arranged on an end of said barrel, said barrel being positioned within said outer casing with its primer bearing end remote from the cover part end of said casing and said cover part being mountable on said barrel in proximity to said primer only after the removal of said weakened portion to separate said cover part and the removal of said barrel from said casing, and a firing member on said cover part for striking and exploding said primer by concussion after said cover part has been so mounted upon said barrel.

MARTIN DWYER.
RALPH ANZALONE.

REFERENCES CITED

The following references are of record in the file of this patent:

UNITED STATES PATENTS

| Number | Name | Date |
|---|---|---|
| 17,407 | Sibley | May 26, 1857 |
| 534,107 | S. Jackson, Jr. | Feb. 12, 1895 |
| 617,576 | W. D. Jackson | Jan. 10, 1899 |
| 1,604,547 | Cimorosi | Oct. 26, 1926 |
| 1,640,892 | Gammeter | Aug. 30, 1927 |
| 1,890,175 | Brandt | Dec. 6, 1932 |
| 1,947,834 | Driggs, Jr. et al. | Feb. 20, 1934 |
| 2,175,477 | McEntegart | Oct. 10, 1939 |
| 2,421,752 | Jones | June 10, 1947 |
| 2,436,751 | Hammell et al. | Feb. 24, 1948 |

FOREIGN PATENTS

| Number | Country | Date |
|---|---|---|
| 720,584 | France | Dec. 4, 1931 |